(12) United States Patent
Broder et al.

(10) Patent No.: US 7,398,461 B1
(45) Date of Patent: Jul. 8, 2008

(54) METHOD FOR RANKING WEB PAGE SEARCH RESULTS

(75) Inventors: Andrei Z. Broder, Menlo Park, CA (US); Farzin Maghoul, Hayward, CA (US)

(73) Assignee: Overture Services, Inc., Pasadena, CA (US)

( * ) Notice: Subject to any disclaimer, the term of this patent is extended or adjusted under 35 U.S.C. 154(b) by 558 days.

(21) Appl. No.: 10/057,331

(22) Filed: Jan. 24, 2002

(51) Int. Cl.
G06F 15/00 (2006.01)
G06F 17/00 (2006.01)

(52) U.S. Cl. .............. 715/208; 715/205; 715/206; 715/207; 715/255; 715/256; 715/234

(58) Field of Classification Search .......... 715/501, 715/513, 530, 531
See application file for complete search history.

(56) References Cited

U.S. PATENT DOCUMENTS

| | | | | |
|---|---|---|---|---|
| 6,112,203 A * | 8/2000 | Bharat et al. | ............ | 707/5 |
| 6,122,647 A * | 9/2000 | Horowitz et al. | ............ | 715/513 |
| 6,411,952 B1 * | 6/2002 | Bharat et al. | ............ | 707/5 |
| 6,415,294 B1 * | 7/2002 | Niemi | ............ | 707/102 |
| 6,633,868 B1 * | 10/2003 | Min et al. | ............ | 707/3 |
| 6,665,837 B1 * | 12/2003 | Dean et al. | ............ | 715/501.1 |
| 6,687,878 B1 * | 2/2004 | Eintracht et al. | ............ | 715/512 |
| 2002/0120645 A1 * | 8/2002 | Adapathya et al. | ............ | 707/501.1 |
| 2002/0129014 A1 * | 9/2002 | Kim et al. | ............ | 707/5 |
| 2003/0208482 A1 * | 11/2003 | Kim et al. | ............ | 707/3 |

OTHER PUBLICATIONS

Google Defintion Search Results, pp. 1-3.*
Quint, Julien; Regular Papers: A Formalism for Universal Segmentation of Text; Jul. 2000; Association for Computational Linguistics; Proceedings of the 18th conference on Computational Linguistics—vol. 2; pp. 656-662.*

* cited by examiner

*Primary Examiner*—Doug Hutton
*Assistant Examiner*—Nathan Hillery
(74) *Attorney, Agent, or Firm*—Dreier LLP; Seth H. Ostrow

(57) ABSTRACT

A system for indexing a document including: receiving a document to be processed for inclusion in an index of documents; locating a set of documents that include hyperlinks to the document; retrieving anchortext associated with each hyperlink; parsing the anchortext into one or more tokens. Then for each token the following acts are performed: determining a weight for the token, determining whether the weight assigned to the token exceeds a threshold token weight; and indexing the document under the token, if the token weight assigned to the token exceeds the threshold token weight.

14 Claims, 4 Drawing Sheets

METHOD FOR RANKING WEB PAGE SEARCH RESULTS

BACKGROUND OF THE INVENTION

1. Field of the Invention

This invention relates generally to computerized information retrieval, and more particularly to retrieving, indexing, and ranking of documents in a hyperlinked information environment such as the World Wide Web (the "Web").

2. Description of the Related Art

The amount of information stored in the Web continues to increase. This makes it more difficult for users to find pages relevant to concepts of interest. Users of computers connected to the Web commonly employ search engines to locate Web pages having specific content. A search engine, such as the AltaVista® search engine, indexes hundreds of millions of Web pages hosted and served by computers all over the world. The users of such engines compose queries, and the search engine identifies pages that match the queries, e.g., pages that include the key words of the queries. The Web is a hyperlinked environment. Pages in the Web generally contain links to other Web pages. The links enable users to navigate the Web. In the page containing the link, usually there is some text associated with the link. In typical browsers the user clicks on this text to follow the link. This text is known as anchortext. For instance, a page about travel may contain a link to www.ual.com, the home page of United Airlines. The anchortext associated with the link might be "United," "United Air Lines," or "U.A.L," entirely at the discretion of the author of the page linking to the United site.

A challenge for search engines is to identify the most relevant resources to the query and to place them first among all the results returned. This ordering of the result set by relevance of results is known as "ranking." Ranking based solely on the content of the documents is only partially effective on such a large scale. Other factors, in particular anchortext, are necessary. One source of difficulty in locating the most relevant documents is the lack of an effective system and method for determining the relevance of indexed documents based on terms used by persons linking to a Web page. In addition to the textual content of the individual pages, the link structure of such collections contains information that can be tapped when identifying the most authoritative sources. The text associated with a link called "anchortext" also provides information useful for identifying relevant and important documents.

Yanhong Li discusses a system called Hyperlink Vector Voting, or HVV, which uses the content of hyperlinks to a document to rank its relevance to the query terms. See Li, Toward A Qualitative Search Engine, IEEE Computing, July-August 1998. HVV assigns importance to pages by analyzing the inbound links to a particular Web site. Authors of Web pages in effect vote for, or endorse, a Web page to which they include hyperlinks. Li provides an example of a page that uses the word "attorney" throughout. However, the word "lawyer" is not used at all. Nevertheless, the page may still have much content relevant to those searching for lawyers. A conventional search system that only seeks documents that use at least some of the query terms would not identify the document using the word "attorney" when responding to queries such as "best lawyers" or "best divorce lawyers." Li also discusses some detriments of HVV, such as the fact that ranking of the documents does not depend on the words appearing in the documents satisfying a given query. Thus, although a Web page may be very popular and hence be the object of many hyperlinks, the content may not be the most relevant to the received query. Moreover, it is also possible to intentionally mislead users of HVV-based search engines by creating a Web page including a large number of hyperlinks all pointing to the same page in order to inflate artificially the connectivity-based ranking of the referenced page. Such techniques are commonly known as spam. Nevertheless, if one can defeat such spamming schemes and other drawbacks, it appears clear that the number of inbound links to a given Web page provide a useful measure of its popularity and perhaps its quality.

As discussed above, the language used in queries by users of search engines is often not the most precise expression of the desired concept. A need thus exists for a connectivity-based indexing system that better uses the information provided by hyperlinks.

SUMMARY OF THE INVENTION

Briefly according to the invention, a document is processed for inclusion in an index of documents. First, one or more documents that include hyperlinks to the document are located. Then, the anchortext associated with each hyperlink is retrieved, and then parsed into one or more tokens. For each token, the following acts are performed: determining a weight for the token, determining whether the weight assigned to the token exceeds a threshold weight, and indexing the document under each token having a weight that exceeds the threshold weight. A document is indexed under a token by assigning a location for the token within the index relating the token to the subject document.

DETAILED DESCRIPTION OF AN EMBODIMENT

Figure 1:
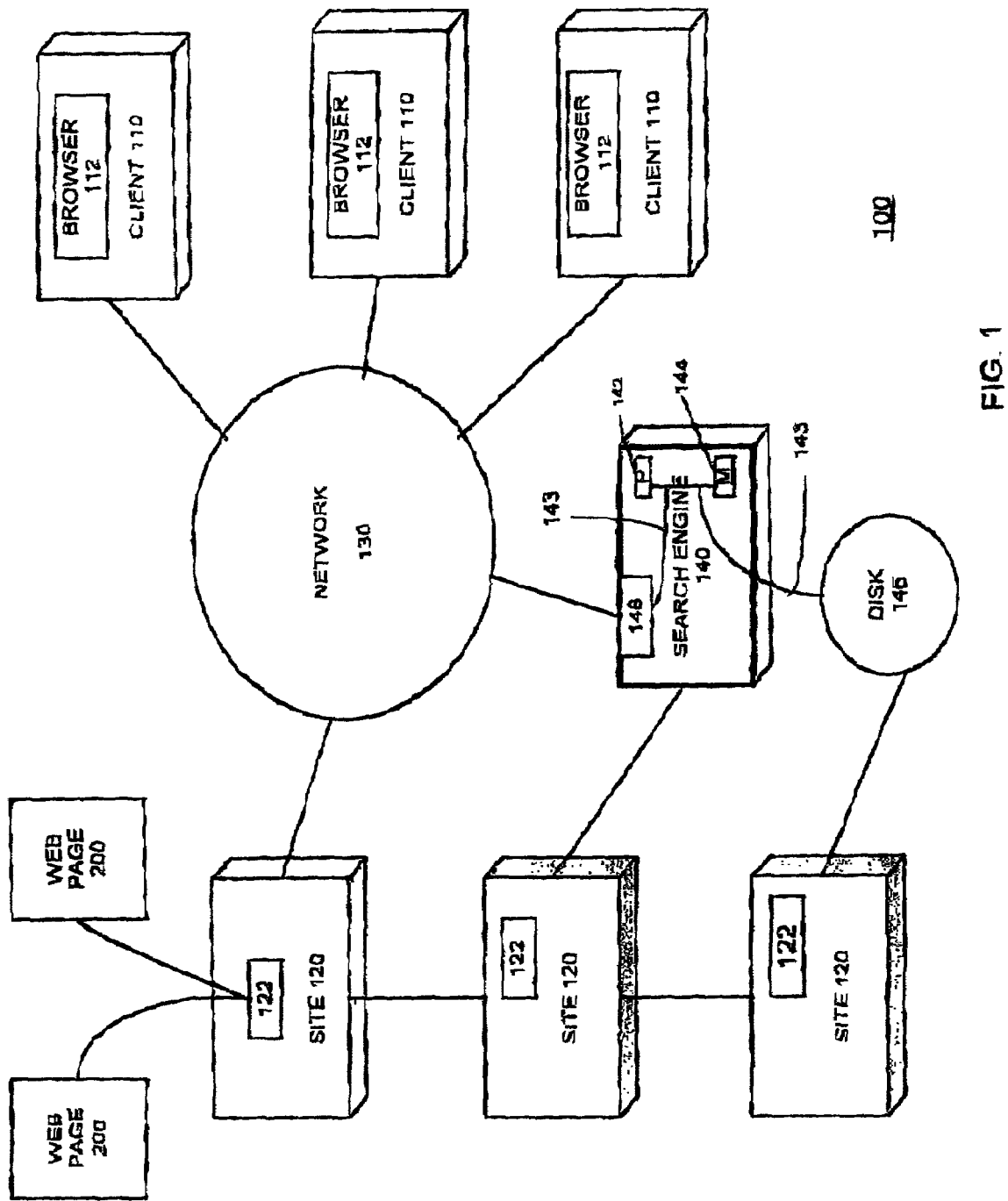
FIG. 1 is a block diagram of a distributed system for processing and storing information indexed according to the invention.

FIG. 1 shows a distributed computer system 100 including a collection of Web pages 200 to be indexed. The distributed system 100 includes client computers 110 connected to server computers (sites) 120 via a network 130. The network 130 can use Internet communications protocols (IP) to allow the clients 110 to communicate with the servers 120.

The client computers 110 can be personal computers (PCs), workstations, or larger or smaller computer systems. Each client 110 typically includes one or more processors, memories, and input/output devices. The servers 120 can be similarly configured. However, in many instances server sites 120 include many computers, perhaps connected by a separate private network. In fact, the network 130 may include hundreds of thousands of individual networks of computers. Although the client computers 110 are shown separate from the server computers 120, it should be understood that a single computer could perform both client and server roles.

During operation of the distributed system 100, users of the client units 110 often desire to access information records 122 stored by the servers 120 using, for example, the Web. The records of information 122 can be in the form of Web pages 200. The pages 200 can be data records including as content plain textual information, or more complex digitally encoded multimedia content, such as software programs, graphics, audio signals, videos, and so forth.

It should be understood that although this description focuses on indexing and locating information on the World Wide Web, the system can also be used for locating and indexing information via other wide or local area networks (WANs and LANs), or information stored in a single computer using other communications protocols.

The clients 110 can execute Web browser programs 112, such as Netscape's NAVIGATOR™ or Microsoft's EXPLORER™ to locate the pages or records 200. The browser programs 112 allow the users to enter addresses of specific Web pages 200 to be retrieved. Typically, the address of a Web page is specified as a Universal Resource Locator (URL). In addition, once a page has been retrieved, the browser programs 112 can provide access to other pages or records by "clicking" on hyperlinks to previously retrieved Web pages. Such hyperlinks provide an automated way to enter the URL of another page, and to retrieve that page.

A search engine system 140 is generally necessary to identify pages of interest among the millions of pages that are available on the Web. The search engine system 140 includes subsystems for parsing the pages, for indexing the parsed pages, for searching the index, and for presenting information about the pages 200 located.

The search engine system 140 can be configured as one or more clusters of multi-processors (P) 142, memories (M) 144, disk storage devices 146, and network interfaces 148 connected to each other by high speed communications buses 143. The processors 142 can be any type of processor that has sufficient processing power and memories for indexing and searching the Web. For smaller collections of information or databases, the search engine can be run on the computer storing the database.

Search Engine Overview

Figure 2:
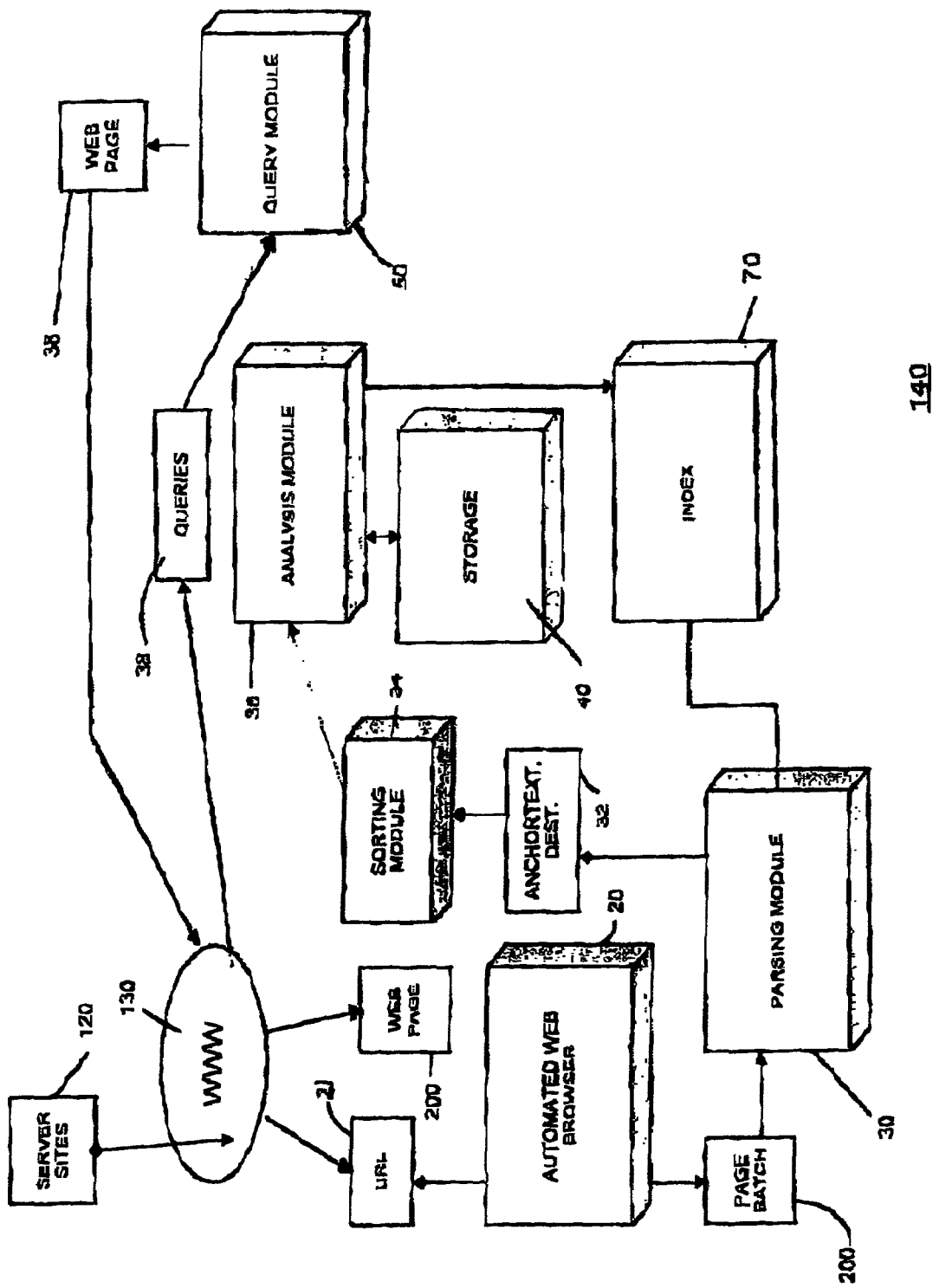
FIG. 2 is a block diagram of a search engine including an index wherein the invention may be used advantageously.

FIG. 2 shows the principal components of the search engine 140. The search engine 140 includes an automated Web browser 20, also called a spider or robot, a parsing module 30, a sorting module 34, an analysis module 36, a query module 50, and an index 70.

Browsing

During the operation of the search engine 140, the automated browser 20, periodically sends out requests for service 21 over the network 130. The requests 21 include URLs. In response to the requests 21, the sites 120 return the records, or pages, 200 to the browser 20. The browser 20 can locate pages by following hyperlinks embedded in previously acquired pages. An example of a browser 20 is described in U.S. Pat. No. 5,974,455, entitled "System and Method for Locating Pages on the World Wide Web." Another example is found in U.S. Pat. No. 6,263,364 entitled "Web Crawler System and Method for Prioritizing Document Downloads and for Maintenance Freshness of Downloaded Documents."

Parsing

The pages 200 can be presented to the parsing module 30 as they are received or in batches which may amount to thousands of pages or more, at one time. The parsing module 30 breaks down the portions of information of the pages 200 into fundamental indexable elements such as the words appearing in the pages 200 and assigns locations to each word. These words and locations are written into the index 70. Each word is a literal representation of the parsed portion of information; the location is a numeric value.

Figure 4:
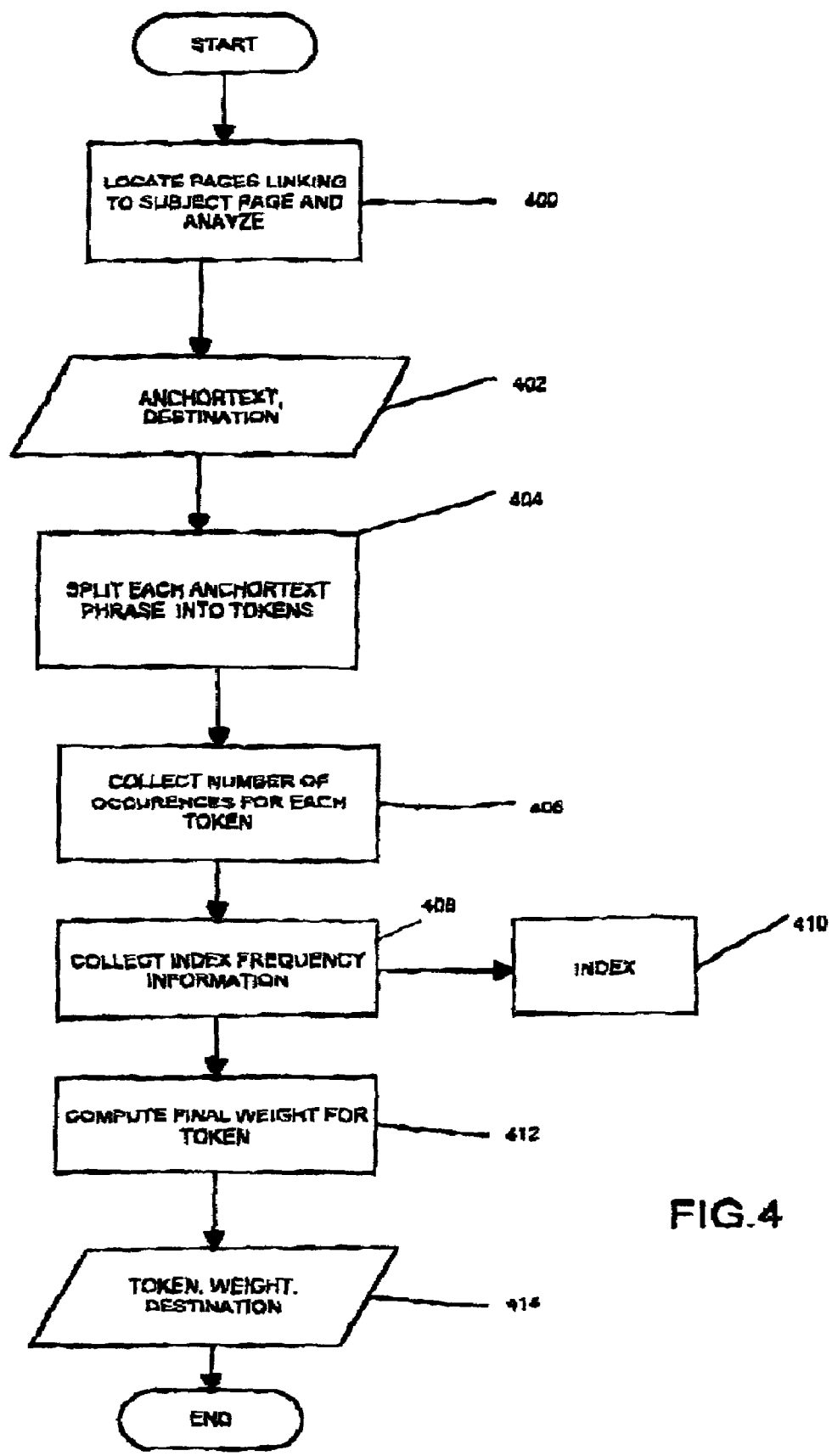
FIG. 4 is a flow chart illustrating a process for analyzing anchortext according to an aspect of the invention.

The parsing module 30 also identifies anchortext and the page address to which it points (destination) in the Web pages 200. This information is then stored for use in the indexing process. The parsing module then transmits anchortext, destination pairs 32 to a sort module 34. The sort module sorts the pairs 32 by destination and provides the result to an analysis module 36. The operation of the analysis module is illustrated in FIG. 4. Anchortext and link destination information is stored in storage area 40 (e.g., a hard disk) for use in indexing Web pages 200.

Referring to FIG. 4, there is shown a process 400 executed by the analysis module 50. The process 400 comprises a series of acts for analyzing the anchortext and destination information. In act 402, the module 36 receives anchortext, destination pairs for each page 200 to be indexed. In act 404, the anchortext is then split into tokens (i.e., words and sequences of words found in each anchortext having page 200 as a destination). In act 406, the number of occurrences of each token, in all of the anchortext pointing to page 200, is determined. In act 408, the frequency of occurrence within the index 70 is determined for each token processed. The result is then written into the index 70.

Indexing

The indexing module 40 sorts the pairs of tokens 400, first in token order, and second in location order. The sorted pairs 400 are used to generate the index 70 of the tokens of the pages 200. In the index 70, each token representing a unique portion of information of the pages 200 is stored only once. All of the locations that are instances of the token in the pages 200 are stored in association with the token. The locations follow the token in order according to their locations. The locations essentially are pointers to the parsed portions of information. According to an aspect of the invention, words or tokens not found in the page 200 but used by others in reference to a page 200 to be indexed are included in the index 70 as if they actually appeared therein and the location reflects their importance. Alternatively, if a token already appears in the index 70 and it is determined that the anchortext information indicates that the token has greater weight than its location within the document 200 indicates, then that token is assigned a location indicative of its greater weight (or other indication of importance).

It should be understood that the number of different unique tokens can be well over one hundred million, since any combination of characters can form tokens of the pages 200. In addition, many frequently occurring tokens, such as the tokens "the," "of," "a," etc., may appear at hundreds of millions of different locations. The extremely large size of the index 70 and its increasing size present special processing problems. Alternatively, if a token already appears in the index 70 and it is determined from the anchortext information that the token has greater weight than its location within the index 70 indicates, then that token is assigned a greater weight, possibly by changing its location within the documents 200.

As described below, the data structures of the index 70 are optimized for query access. This means that the token-location pairs 400 are compressed to reduce storage, and uncompressing is minimized in order to preserve processor cycles during searching. Furthermore, the data structures of the index 70 also allow concurrent maintenance of the index 70 to delete old entries and to add new entries while queries are processed.

Querying

Users interact with the index 70 via the query module 50 by providing queries 36. Users can be located remotely or locally with respect to the search engine 140. The terms of a query can include words and phrases, e.g., multiple words enclosed in quotation marks ("). The terms can be related by Boolean operators such as OR, AND, and NOT to form expressions.

As a result of searching the index 70 addresses of pages which are qualified by the queries are identified. The query module 50 delivers information (in the form of Web pages 38) about the qualifying pages to the users. The information 38 can include a summary of the pages located. Using the summary information, the users can access the identified pages with Web browsing software, or other techniques.

Figure 3:
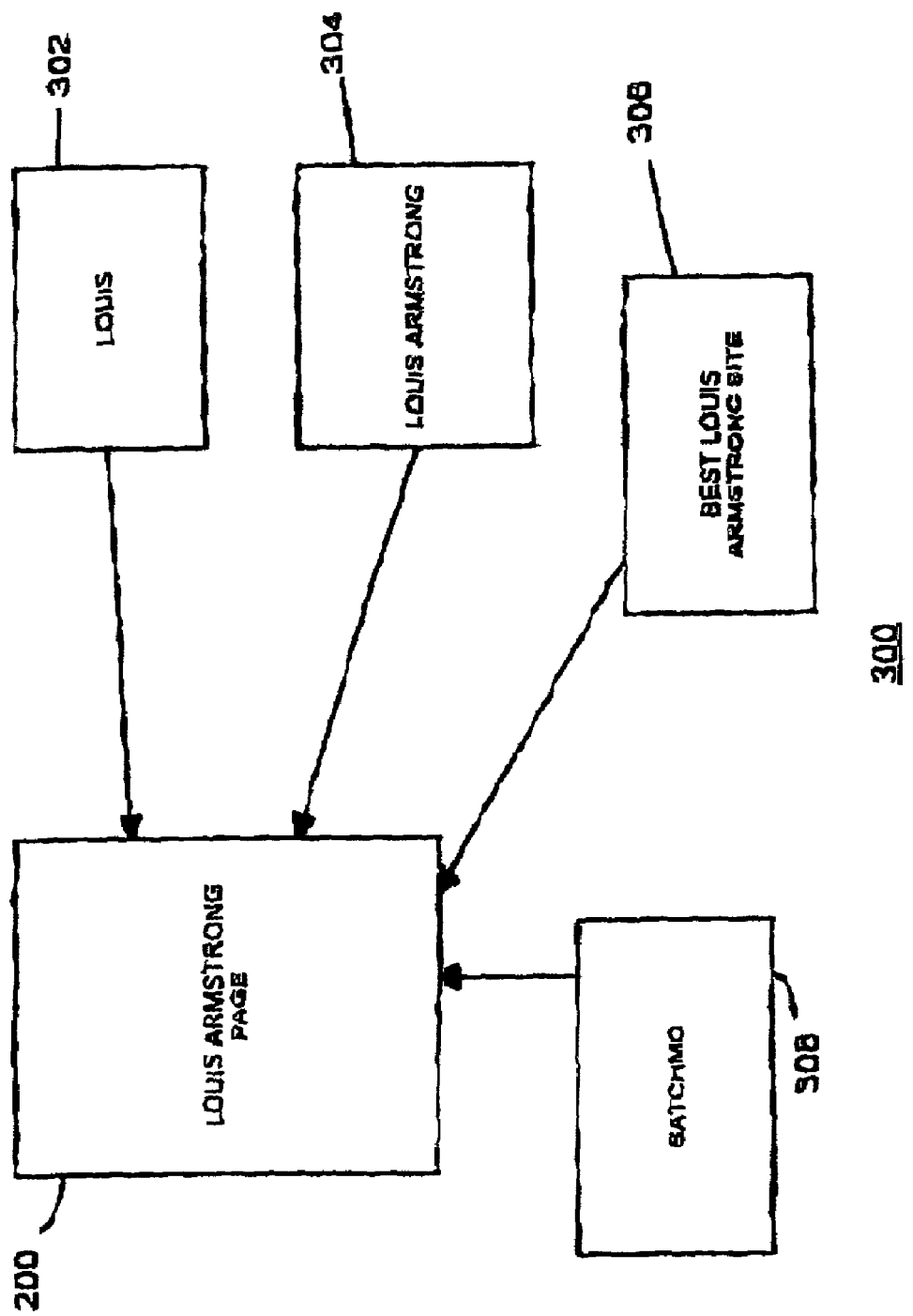
FIG. 3 is an illustration of Web page connectivity related to a Web page to be indexed.

FIG. 3 shows the Web page 200 to be indexed and a plurality of Web pages 302, 304, 306, and 308, each including at least one hyperlink to page 200. The page 200 is a page having content that relates to the musician, Louis Armstrong. The Web pages 302-308 each include at least one hyperlink to page 200. These hyperlinks are presented to a user as highlighted text, called anchortext. When a user clicks on one of the hyperlinks his or her browser transmits a request for service of the Web page associated with the hyperlink. The anchortext in page 302 is the word "Louis," page 304 includes anchortext, "Louis Armstrong," page 306 includes anchortext, "best Louis Armstrong site," and page 308 includes anchortext, "Satchmo." In point of fact, Page 200 is highly relevant to the subject "Louis Armstrong" but conventional ranking methods may not rank the page 200 as highly as it deserves because the precise query terms may not appear in the page as frequently as in other, less relevant, pages or there may be many more sites linking to other less relevant pages. The page 200 has the url: "www.satchography.com. It is an actual site devoted to the discography of Louis Armstrong. According to the invention, the information represented by the anchortext in each of the pages 302-308 is analyzed to arrive at an improved indexing scheme that uses the anchortext information to assist in determination of the relevance of page 200.

Thus, according to an embodiment of the invention, the anchortext associated with links to page 200 is used when indexing page 200 so that the information included in the index entry for page 200 better reflects the information contributed by anchortext relating to page 200 found in other pages. The anchortext can take the form of a single hyperlinked word or a hyperlinked phrase comprising two or more terms. Once an anchortext phrase is identified, it is converted into a set of tokens. For, example page 306 contains the phrase "best Louis Armstrong site" pointing to page 200. The tokenization produces the following tokens:

"Best Louis Armstrong site"

"Louis Armstrong"

"Louis"

"Armstrong"

"Best"

"Best Louis"

"Best Armstrong"

"Best site"

When there are several tokens pointing to the same site it is advantageous to determine which the important terms are. One way to this is to determine the weight of each token when compare with the weight of all tokens pointing to the same page. This is called the normalized weight. Weight is assigned to each of these tokens according to any of several importance criteria. One criterion of importance assigns the greatest importance to words that appear the least frequently in the index 70, based on the theory that those words are more specifically related to the concept that a user would attempt to express. According to an aspect of the invention, weights are assigned to each token according to their relation to a phrase in which they occur. In other words, the weight of the query phrase in which a term appears contributes to the weight of the term or token. The reason for this is that the term is more important because it appears in the phrase than it would if it did not. The weight of a term with respect to a phrase in which it appears is determined as follows: first, the weight is calculated:

$$W(\text{term}) = \Sigma f(\text{phrase})/f(\text{term}) \times ATC(\text{phrase}) + ATC(\text{term})$$

Where $W(\text{term})$ is the weight of the term, $f(\text{phrase})$ is the frequency of occurrence of the referenced phrase within the index, $f(\text{term})$ is the frequency of occurrence of the referenced term within the index, $ATC(\text{phrase})$ is the anchortext count for the phrase and $ATC(\text{term})$ is the anchortext count for the term.

Thus, the weight of the token "Armstrong" appearing in the above phrase is calculated as follows.

$$W(\text{``Armstrong''}) = f(\text{``Best Louis Armstrong site''})/f(\text{``Armstrong''}) \times ATC(\text{``Best Louis Armstrong site''}) + ATC(\text{``Armstrong''}) + f(\text{``Louis Armstrong''})/f(\text{``Armstrong''}) + \ldots \text{[for all tokens]}$$

The term's normalized weight is determined by dividing the weight of the term by the summation of weights for all the tokens for the phrase, taking the square root of the quotient and multiplying it by the base ten logarithm of the weight of the term. Tokens that appear very frequently (e.g., site or best) may be discounted because they do not have specific importance in the context of the subject document. These common tokens can be identified by looking them up in a dictionary of common tokens or terms, searching for them in the index by or other means. Hence, every token is assigned a weight and those tokens having a weight that is less than a threshold weight are discounted. Those tokens that are not discounted are assigned a location in the set of entries for the page 200 being indexed (i.e., the document is indexed under such tokens). The location is based on the weight attached to the token. In the present embodiment, the tokens with the greatest weights are assigned the locations in the beginning of the document because the convention for the search engine 140 is that the most important terms or words in the page are assigned lower locations (at the beginning of the document entries). However, it should be noted that other search engines may assign different locations for the most important tokens, or may attribute importance by means other than location.

In some cases, a token assigned a high weight does not appear in the page being indexed. Therefore, the token is inserted as a new word within the entries relating to the subject page. This enables users who use the token as a keyword to locate the page. For example, assume that page 200 does not include the word "Satchmo," a common nickname for Louis Armstrong. However, page 308 includes "Satchmo" as anchortext in a link to the page 200. If the token Satchmo is assigned a sufficiently high weight (e.g., greater than a threshold or higher than other tokens) it is inserted into the index entries for page 200 as if it actually appeared therein. In the event that the page 200 is already indexed under "Satchmo" the weight of the token can be used to change the location of the token if weight merits a location of greater ranking weight than was previously assigned to the token. Alternatively, the weight of the token "Satchmo" can be indicated by some other means in the index. The weight of the anchortext is thus useful for purposes of indexing documents to be searched but tokens having heavy weights provide information about a page that may be useful for purposes as well.

Referring to FIG. 4, there is shown a generalized flow chart summarizing a method of indexing documents according to an embodiment of the invention is illustrated. Once a page 200 to be indexed is received, in step 400 all pages linking to that page 200 are located and analyzed to produce anchortext and destination pairs 402 for each page linking to the page 200. In step 404, each anchortext phrase is split into tokens.

In step 406, the number of occurrences for each token is determined. Step 408 collects the index frequency information and writes it into the index 410. Step 412 computes the final weight for each token to produce token weights and destinations to be used in indexing each document 200.

We claim:

1. A method for including a document in an index in a hyperlinked environment, comprising the acts of:
  receiving a document to be processed;
  locating a set of documents that include hyperlinks to the document;
  retrieving anchortext associated with at least one of the hyperlinks;
  parsing the anchortext into one or more tokens;
  for each token:
  determining a weight for the token,
  determining whether the weight assigned to the token exceeds a threshold token weight; and
  indexing the document under the token, if the token weight assigned to the token exceeds the threshold token weight, wherein the indexing act includes assigning to the token a location within the index corresponding to part of the page being indexed that is allocated for tokens having a higher degree of importance than other tokens in the same page.

2. The method of claim 1, wherein the indexing act comprises including in the index an indication of weight for each token under which each page is indexed.

3. The method of claim 1, wherein the indexing act comprises assigning to the token a location within the index that corresponds to the beginning of the page being indexed.

4. The method of claim 1, wherein the weight of each token is based on its frequency of occurrence within the index.

5. The method of 1, wherein the act of determining a weight comprises: determining a first frequency at which the anchortext appears in the index; determining a second frequency at which each token derived from the anchortext appears in the index; and assigning a weight to the token, wherein the weight is a function of the first and second frequencies.

6. The method of claim 5, further comprising dividing the first frequency by the second frequency to produce a weight quotient; and multiplying the weight quotient by an anchor text count for the token.

7. The method of 5 further comprising determining a normalized weight for each token.

8. A program product embedded in a computerized machine-readable medium for including a document in an index in a hyperlinked environment, comprising the instructions for:
  receiving a document to be processed;
  locating a set of documents that include hyperlinks to the document;
  retrieving anchortext associated with each hyperlink;
  parsing the anchortext into one or more tokens;
  and program instructions for each token comprising instructions for:
  determining a weight for the token,
  determining whether the weight assigned to the token exceeds a threshold token weight; and
  indexing the document under the token, if the token weight assigned to the token exceeds the threshold token weight, wherein the indexing includes assigning to the token a location within the index corresponding to part of the page being indexed that is allocated for tokens having a higher degree of importance than other tokens in the same page.

9. The computer program product of claim 8 wherein the indexing instruction comprises including in the index an indication of weight for each token under which each page is indexed.

10. The computer program product of claim 8, wherein the weight of each token is based on its frequency of occurrence within the index.

11. The computer program product of claim 8, wherein the indexing act comprises assigning to the token a location within the index that corresponds to the beginning of the page being indexed.

12. The computer program product of claim 8, wherein the instruction of determining a weight comprises:
  determining a first frequency at which the anchortext appears in the index;
  determining a second frequency at which each token derived from the anchortext appears in the index; and
  assigning a weight to the token, wherein the weight is a function of the first and second frequencies.

13. The program product of claim 8, further comprising the instruction of determining a normalized weight for each token.

14. A computer system for indexing a document in a hyperlinked environment, comprising:
  a receiver for receiving a document to be processed for inclusion in an index of documents;
  a module for locating a set of documents that include hyperlinks to the document;
  a module for retrieving anchortext associated with each hyperlink;
  a parsing module for parsing the anchortext into one or more tokens;
  a module for:
  determining a weight for the token,
  determining whether the weight assigned to the token exceeds a threshold token weight; and
  indexing the document under the token, if the token weight assigned to the token exceeds the threshold token weight, wherein indexing includes assigning to the token a location within the index corresponding to part of the page being indexed that is allocated for tokens having a higher degree of importance than other tokens in the same page.

* * * * *